United States Patent
Ponekker et al.

(10) Patent No.: US 11,005,903 B2
(45) Date of Patent: *May 11, 2021

(54) PROCESSING OF STREAMED MULTIMEDIA DATA

(71) Applicant: INTERNATIONAL BUSINESS MACHINES CORPORATION, Armonk, NY (US)

(72) Inventors: Zoltán Ponekker, Szabadbattyán/Fejér (HU); Ákos Gyimesi, Budapest (HU); Balázs Vida, Pomáz/Pest (HU); József Tamás Ecsédi, Szentes/Csongrád (HU); Dávid Simon, Budapest (HU); Sándor Lovász, Budapest (HU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/391,867

(22) Filed: Apr. 23, 2019

(65) Prior Publication Data

US 2019/0253471 A1 Aug. 15, 2019

Related U.S. Application Data

(63) Continuation of application No. 15/202,689, filed on Jul. 6, 2016, now Pat. No. 10,356,146.

(Continued)

(51) Int. Cl.
*H04L 29/06* (2006.01)
*G06F 15/16* (2006.01)

(52) U.S. Cl.
CPC ........ *H04L 65/601* (2013.01); *H04L 65/4084* (2013.01); *H04L 65/605* (2013.01);

(Continued)

(58) Field of Classification Search
None
See application file for complete search history.

(56) References Cited

U.S. PATENT DOCUMENTS

| | | | | |
|---|---|---|---|---|
| 2003/0033347 | A1* | 2/2003 | Bolle ................. | G06F 16/7834 718/107 |
| 2008/0060029 | A1* | 3/2008 | Park ................... | G11B 27/034 725/89 |

(Continued)

OTHER PUBLICATIONS

Office Action (dated Feb. 27, 2018) for U.S. Appl. No. 15/202,689, filed Jul. 6, 2016.

(Continued)

*Primary Examiner* — James A Edwards
(74) *Attorney, Agent, or Firm* — Schmeiser, Olsen & Watts, LLP; James Nock

(57) ABSTRACT

A method and system for streaming multimedia data over a communication network. Each segment of multiple segments is associated with at least two data blocks of multiple data blocks. The segments are sequenced according to a unique stream index for one stream associated with multimedia content. The unique stream index for the one stream is assigned a main index that describes multiple streams for the multimedia content. The multiple streams include the one stream. A request for content of the multimedia content is received. The request specifies a data chunk, of the multiple data chunks, that denotes the requested content. The main index is analyzed with respect to the specified data chunk to determine the stream and segments and/or data blocks therein that encompass the requested content. The determined stream and segments and/or data blocks therein are transmitted over the communication network in response to the request.

9 Claims, 7 Drawing Sheets

Related U.S. Application Data

(60) Provisional application No. 62/189,986, filed on Jul. 8, 2015.

(52) U.S. Cl.
CPC ............ *H04L 65/607* (2013.01); *G06F 15/16* (2013.01); *H04L 65/00* (2013.01)

(56) References Cited

U.S. PATENT DOCUMENTS

| | | |
|---|---|---|
| 2012/0243561 A1 | 9/2012 | Loghin et al. |
| 2013/0007223 A1* | 1/2013 | Luby .................... H04L 65/604 709/219 |
| 2014/0269905 A1 | 9/2014 | Frigo et al. |
| 2015/0032851 A1 | 1/2015 | Lieber |
| 2017/0013040 A1 | 1/2017 | Ponekker et al. |

OTHER PUBLICATIONS

Amendment (dated May 29, 2018) for U.S. Appl. No. 15/202,689, filed Jul. 6, 2016.

Final Office Action (dated Sep. 7, 2018) for U.S. Appl. No. 15/202,689, filed Jul. 6, 2016.

Final amendment (dated Nov. 2, 2018) for U.S. Appl. No. 15/202,689, filed Jul. 6, 2016.

Advisory Action (dated Nov. 16, 2018) for U.S. Appl. No. 15/202,689, filed Jul. 6, 2016.

RCE (dated Dec. 6, 2018) for U.S. Appl. No. 15/202,689, filed Jul. 6, 2016.

Notice of Allowance (dated Mar. 6, 2019) for U.S. Appl. No. 15/202,689, filed Jul. 6, 2016.

* cited by examiner

PROCESSING OF STREAMED MULTIMEDIA DATA

This application is a continuation application claiming priority to Ser. No. 15/202,689, filed Jul. 6, 2016, now U.S. Pat. No. 10,356,146, issued Jul. 16, 2019, which claims priority to U.S. Provisional No. 62/189,986 filed on Jul. 8, 2015, which is incorporated herein by reference in its entirety.

TECHNICAL FIELD

The present invention relates to multimedia content, and more particularly, to processing, storage and delivery of the multimedia content over a communication network.

BACKGROUND

Streaming multimedia content and/or data over a communication network, especially when the streaming is live, and especially when large scales of users may subscribe to and request content and/or data, presents a number of challenges such as network outages, connectivity issues, unusual ingest formats, temporary breaks in stream, and the like. Conventional content delivery techniques often address only portions of these challenges, but fail to provide comprehensive and scalable solutions.

SUMMARY

The present invention provides a method and associated device for streaming multimedia data over a communication network. One or more processors of a device receive data associated with multimedia content over the communication network. The one or more processors process portions of the data into multiple data blocks. The one or more processors associate the multiple data blocks with multiple segments by associating each segment with at least two data blocks of the multiple data blocks. The one or more processors sequence the segments of the multiple segments according to a stream index. The one or more processors assign the stream index to a main index that describes a set of streams for the multimedia.

BRIEF DESCRIPTION OF THE DRAWINGS

The embodiments herein may be better understood by referring to the following description in conjunction with the accompanying drawings. Understanding that these drawings depict only exemplary embodiments of the present invention and are not therefore to be considered to be limiting of its scope, the principles herein are described and explained with additional specificity and detail through the use of the accompanying drawings.

A component or a feature that is common to more than one drawing is indicated with the same reference number in each of the drawings.

DETAILED DESCRIPTION

The present invention describes techniques pertaining to a unified multimedia format and/or unified multimedia processes (e.g., ingest, store, serve, etc.) for streaming multimedia content, including but not limited to, live content such as a live broadcast, buffered content such as digital video recording (DVR), recorded content such as video on demand (VOD), and the like. These techniques, in particular: provide a simple, easy-to-use media format that addresses the above discussed challenges and further meets requirements set by live streaming, DVR, live VOD, and regular VOD; can easily transfer/replicate data to alternative storages in its entirety, or even in part, while the corresponding multimedia content is in progress (e.g., live); support parallel data upload of streams while the data is locked or under atomic file operation; protect data stream storage from limitations from audio/video codec of other formats; store metadata or any other information, even while the corresponding multimedia content is in progress; correct certain missing portions of stream versions retrospectively and for ex post transcoding; and provide stream flexibility (e.g., add, swap or remove full stream versions retrospectively (e.g.: retrospective VOD transcoding)).

These techniques may be employed in communication networks that include content Delivery Networks (CDNs), as discussed in greater detail below. However, such communication networks are shown and described as examples and for purposes of illustration, not limitation. It is appreciated that the techniques discussed herein may be generally applicable to any number of networks, and for handling multiple types of multimedia content.

Figure 1:
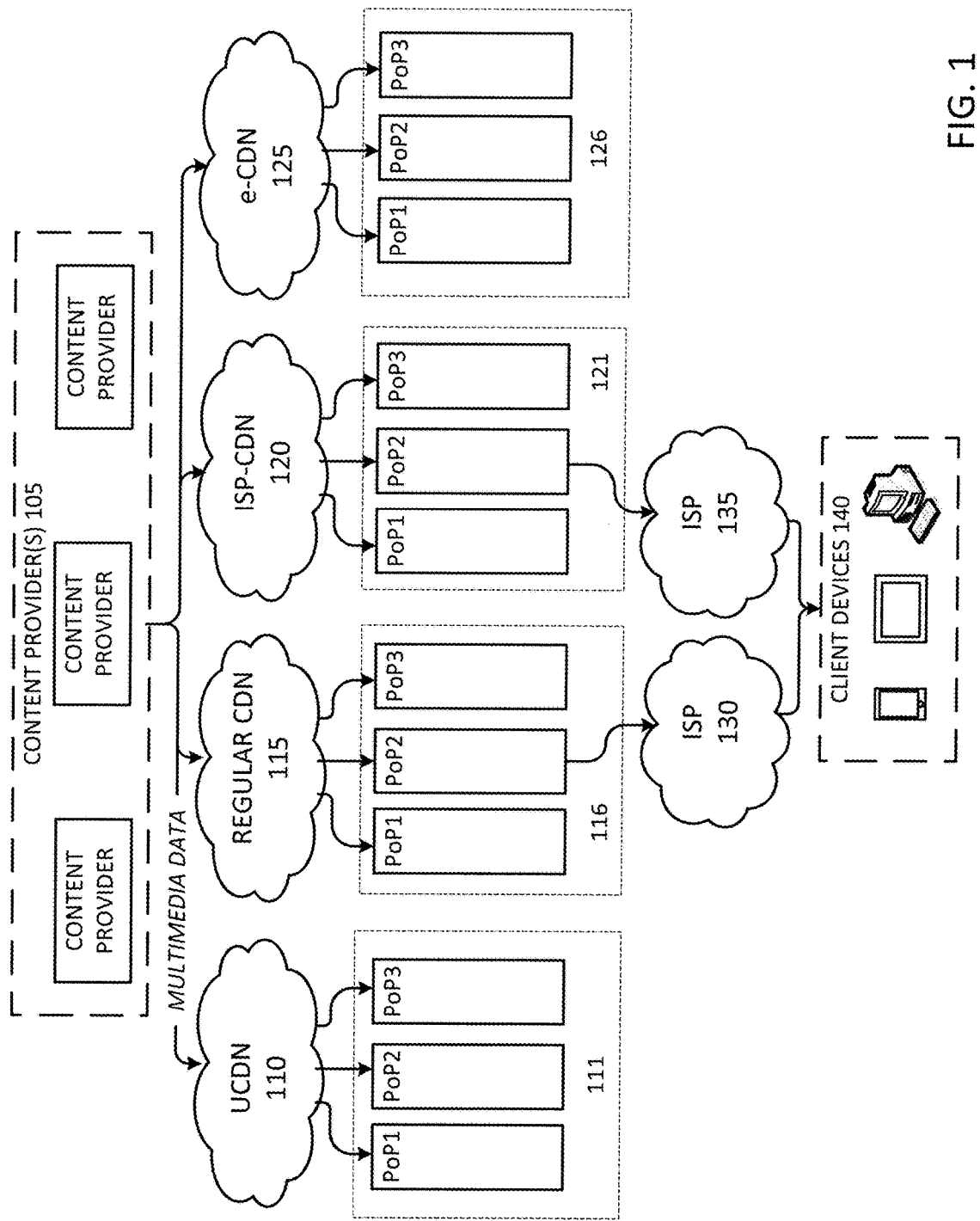
FIG. 1 illustrates an example communication network, in accordance with embodiments of the present invention.

FIG. 1 illustrates an example communication network 100, in accordance with embodiments of the present invention. Communication network 100 illustratively shows content providers 105 as well as a geographically distributed collection of sub-networks, including various Content Delivery Networks (CDNs) (e.g., UCDN 110, Regular CDN 115, ISP-CDN 120, and eCDN 125), corresponding Point of Presence (PoP) servers (e.g., PoPs 111. PoPs 116, PoPs 121, and POPs 126), and two Internet Service Provider (ISP) networks (e.g., ISP 130 and ISP 135), and client devices 140 (e.g., customers, subscribers, etc.). CDNs, such as those shown in communication 100, locally store and serve requested content to end users (e.g., in client devices 140). For example, content providers 105 (e.g., media companies, e-commerce vendors, etc.) may contract with CDN operators (e.g., operators of CDN 110, 115, 120, 125, etc.) to deliver content from the respective CDN operators to a requesting end-user (e.g., client devices 140). The CDN operators, in turn, contract with one or more ISPs (e.g., ISP 130, 135, etc.), carriers, and/or other network operators to host servers in data centers of the one or more ISPs, carriers, and/or other network operators. In this fashion, CDNs improve performance, availability of content, and also offload network traffic served directly from the content provider's origin infrastructure, resulting in potential cost savings for the content provider. Thus, the present invention improves the technology of streamed multimedia data processing.

Client devices 140 typically request content from respective ISP(s). These requests from the client devices 140 are typically directed to an appropriate CDN (or even directly to a content provider in some instances) through the PoPs. In particular, PoPs 111, 116, 121 and 126, sometimes referred to as "edges" or "edge network nodes/devices", facilitate content transfer between ISP(s) (e.g., ISP 130 and 135) and respective CDNs. PoPs typically represent the closest "edge" from the perspective of an end-user or client device relative to CDN assets or content. For example, when a client device requests content (e.g., from one of content providers 105), the request may be directed through an ISP, a corresponding PoP, to a local CDN. Various other network devices or nodes facilitate this process of directing the request (e.g., routers, switches, Domain Name Service (DNS) nodes, and the like). However, for purposes of simplicity, such other network devices or nodes are not shown in FIG. 1. In response to the request for content, the CDN serves/provides the content to the client device (again, through corresponding PoP(s), ISP(s), etc.).

As discussed above, communication network 100 is shown for purposes of simplicity, not limitation. For example, as is appreciated by those skilled in the art, the devices and networks shown are interconnected by various communication links (e.g., wired, wireless, etc.) and segments for transporting data, which further support various methods for communication and communication protocols. Further, the networks and sub-networks shown in FIG. 1 can represent many different types of networks (e.g., ranging from local area networks (LANs) to wide area networks (WANs)). It is appreciated that any number of devices, networks, links, etc. may be used in the communication network 100 and further, each of the sub-networks can include or exclude any number of devices or nodes (e.g., switches, routers, etc.), as appropriate.

Figure 2:
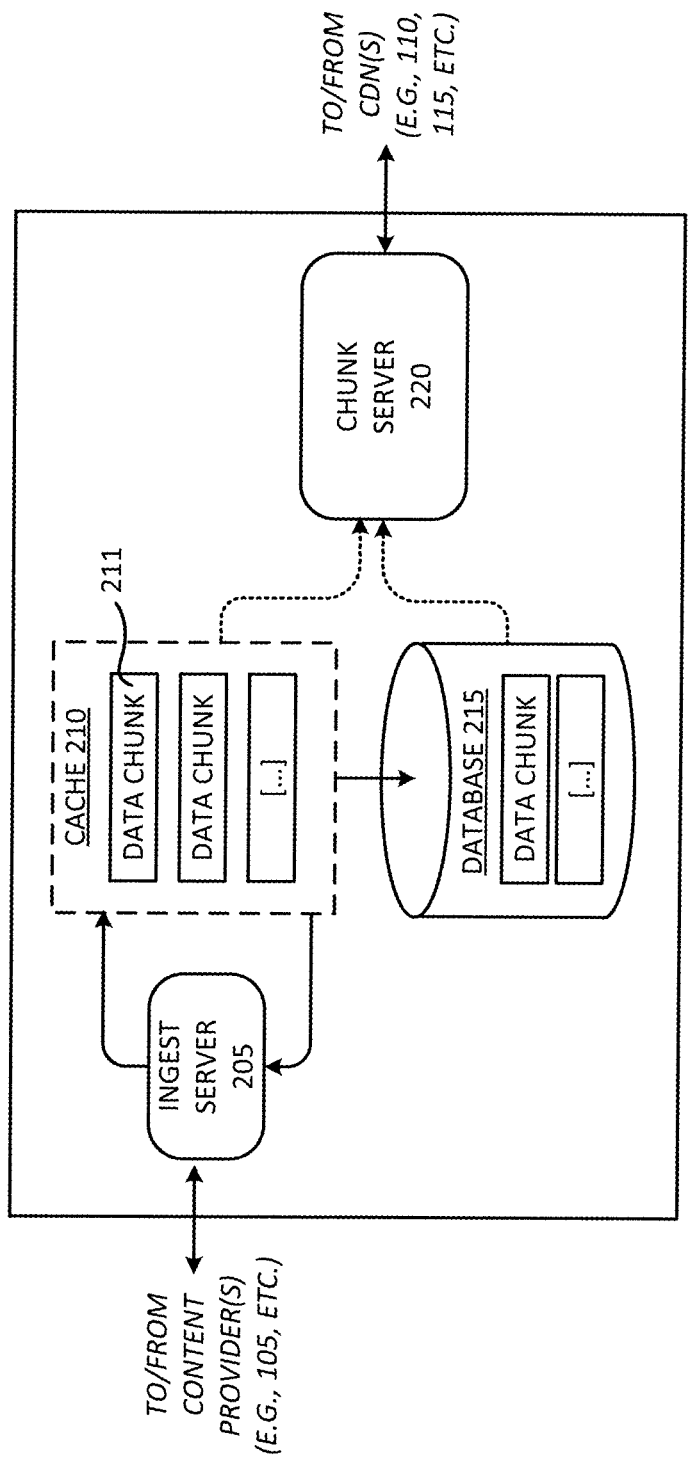
FIG. 2 illustrates an example schematic block diagram of a chunk processing architecture, in accordance with embodiments of the present invention.

FIG. 2 illustrates a schematic block diagram of a chunk processing architecture 200, in accordance with embodiments of the present invention. In one embodiment, chunk processing architecture 200 employs the unified processing/unified multimedia format techniques disclosed herein. As shown, chunk processing architecture 200 provides a unified multimedia process for processing and streaming multimedia content (e.g., ingest, store, serve, etc.). For example, chunk processing architecture 200 processes multimedia content, and provides multimedia content as a streaming transmission to one or more CDNs (e.g., CDN(s) 110, 115, 120, 125, as shown in FIG. 1).

Chunk processing architecture 200 includes an ingest server 205, a cache 210 to temporarily store one or more data chunks 211, a database 215 for long term storage of the one or more data chunks 211, and a chunk server 220. Operationally, ingest server 205 receives multimedia content from content providers. As discussed above, the multimedia content can include, for example, live broadcast content. Ingest server 205 executes, in one embodiment, a chunking application to process (e.g., break up) the streaming multimedia content into smaller data chunks 211. The term "data chunks", as used herein, refer to a fragment or portion of data stored in various multimedia formats (e.g., flash video (FLV, F4V), MPEG4, PNG, IFF, MP3, AVI, etc.). The data chunks are typically initially stored in cache 210 (e.g., local to ingest server 205) for short term storage and in database 215 for long term storage (e.g., external storage, distributed storage, etc.). When chunk server 220 receives a multimedia content request, chunk server 220 converts data chunks corresponding to the request into a specified format suitable for the client device (e.g., FLV, etc.), and transmits the corresponding data chunks in the specified format to the CDNs for delivery to the client device.

In one embodiment, as discussed above, the data chunks are stored in a universal format (e.g., a unified format) to facilitate efficient processing by chunk server 220 (e.g., storage, conversion into other formats, etc.). Further, in some embodiments, ingest server 205 and/or chunk server 220 are configured to dynamically process data stored in the universal format to adjust a chunk size on demand for any output format. Significantly, dynamically adjusting the chunk size on demand divorces storage size requirements from transmission and/or streaming size requirements. For example, ingest server 205 and/or chunk server 220 may be configured to build chunks from stored data packets (e.g., data packets that form blocks, stream segments, etc., discussed in greater detail below) for requested multimedia content at an appropriate size specific to a format For example, serving/streaming chunks for HTTP (e.g., MPEG TS for iOS transmission, etc.) can include five second long chunks. Accordingly, chunk server 220 dynamically builds data chunks from data stored in the universal format for a specified output format (e.g., five second long chunks) on demand. Thus, the present invention improves the technology of streamed multimedia data processing.

Notably, the data chunks are typically associated with a particular multimedia identifier (e.g., a broadcast) such as an index file, which is specified in a request for content (discussed in greater detail below). Further, the data for a particular index file may be further indexed or otherwise associated with a time relative to the multimedia content.

Ingest server 205 also processes multimedia content, including live broadcast content and video content, into data chunks, which obviates a need for additional recording devices. In this fashion, multimedia content for either video or live broadcast is processed and delivered in the same way (e.g., requesting an appropriate subset of data chunks from an index file). Further, creating a video on demand (VOD) is as easy as specifying the data chunks in an index file. Chunk processing architecture 200 also ensures that any processed VOD is an exact replica of a live stream, since the data chunks for the VOD includes the same data chunks as the live stream. Additionally, less storage space is needed by storing only one set of data chunks in the universal format (for later format conversion) instead of storing multiple videos according to various formats. In this fashion, specific video formats can be created dynamically, in real-time and on-demand, thus preserving resources (e.g., the processing is only performed when requested). Moreover, a late-joining viewer does not have to start watching a multimedia content stream mid-live or even wait for the end of a live stream broadcast and subsequent upload of (an edited) recording. Instead, multimedia data chunks for the live stream broadcast index file can be accessed and viewed on delay similar to DVR recordings. Thus, chunk processing architecture 200 blurs the lines between live, DVR and video-on-demand content. Thus, the present invention improves the technology of streamed multimedia data processing.

Figure 3:
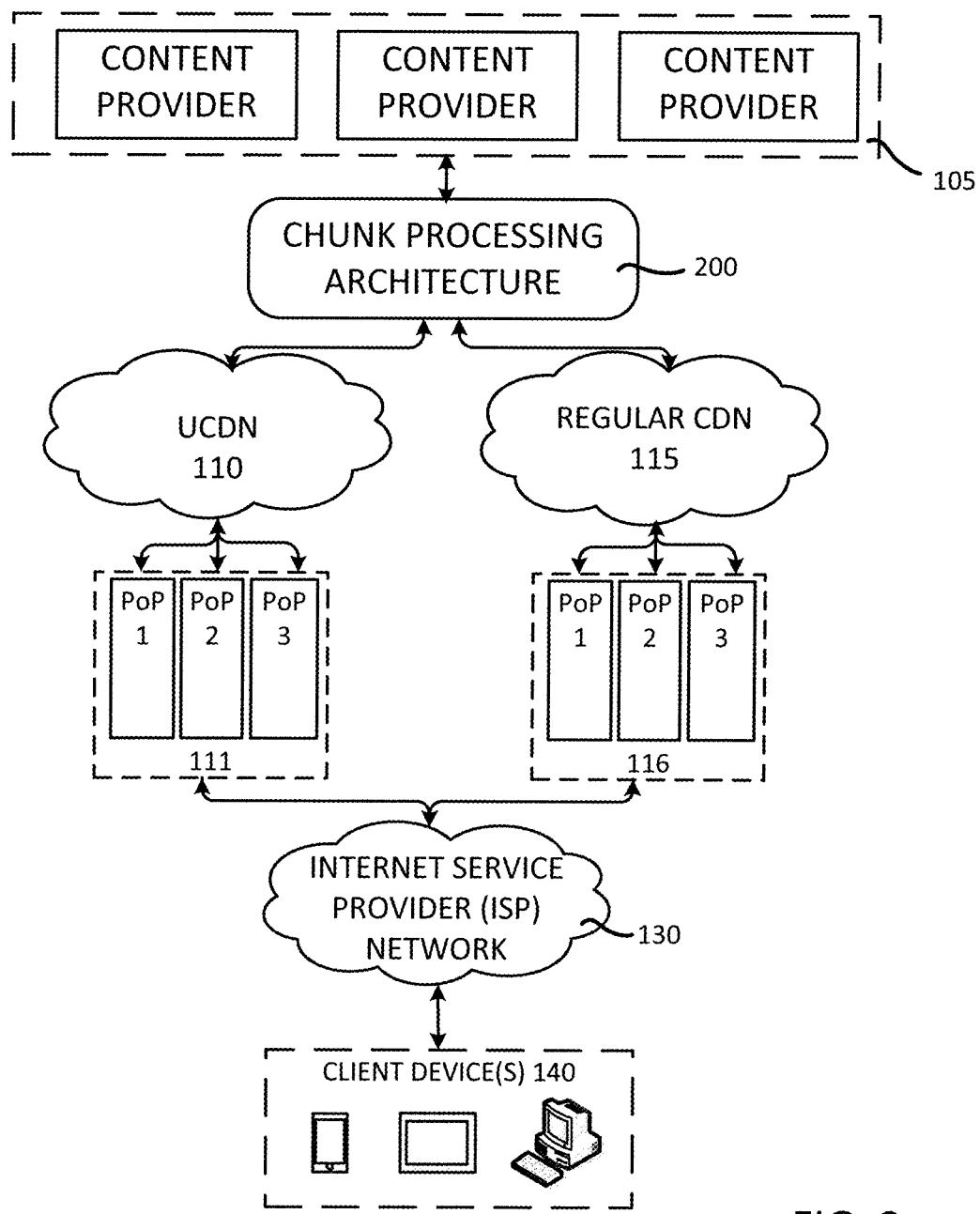
FIG. 3 illustrates another example communication network, in accordance with embodiments of the present invention.

FIG. 3 illustrates another example communication network 300, in accordance with embodiments of the present invention. The communication network 300 includes content providers 105, chunk processing architecture 200, UCDN 110, regular CDN 115, corresponding PoPs 111 and 116, ISP 130 and client devices 140. As shown, chunk processing architecture 200 is positioned between the CDNs (i.e., UCDN 110 and regular CDN 115) and content providers 105.

Chunk processing architecture 200 is deployed, in one embodiment, as a software framework instantiated as a dynamic, request based response. That is, chunk processing architecture 220 can be incorporated within application servers in the content networks and/or the CDN networks. When a CDN and/or content provider receives a request for content, the CDN and/or content provider can instantiate the resources required for the chunk processing architecture 220 to process the request for content (e.g., data) and identify corresponding data chunks, as discussed above. In this fashion, the chunk processing architecture 200 is scalable and can be instantiated multiple times as a distributed processing architecture to process large volumes of requests for multimedia content. Thus, the present invention improves the technology of streamed multimedia data processing.

Figure 4:
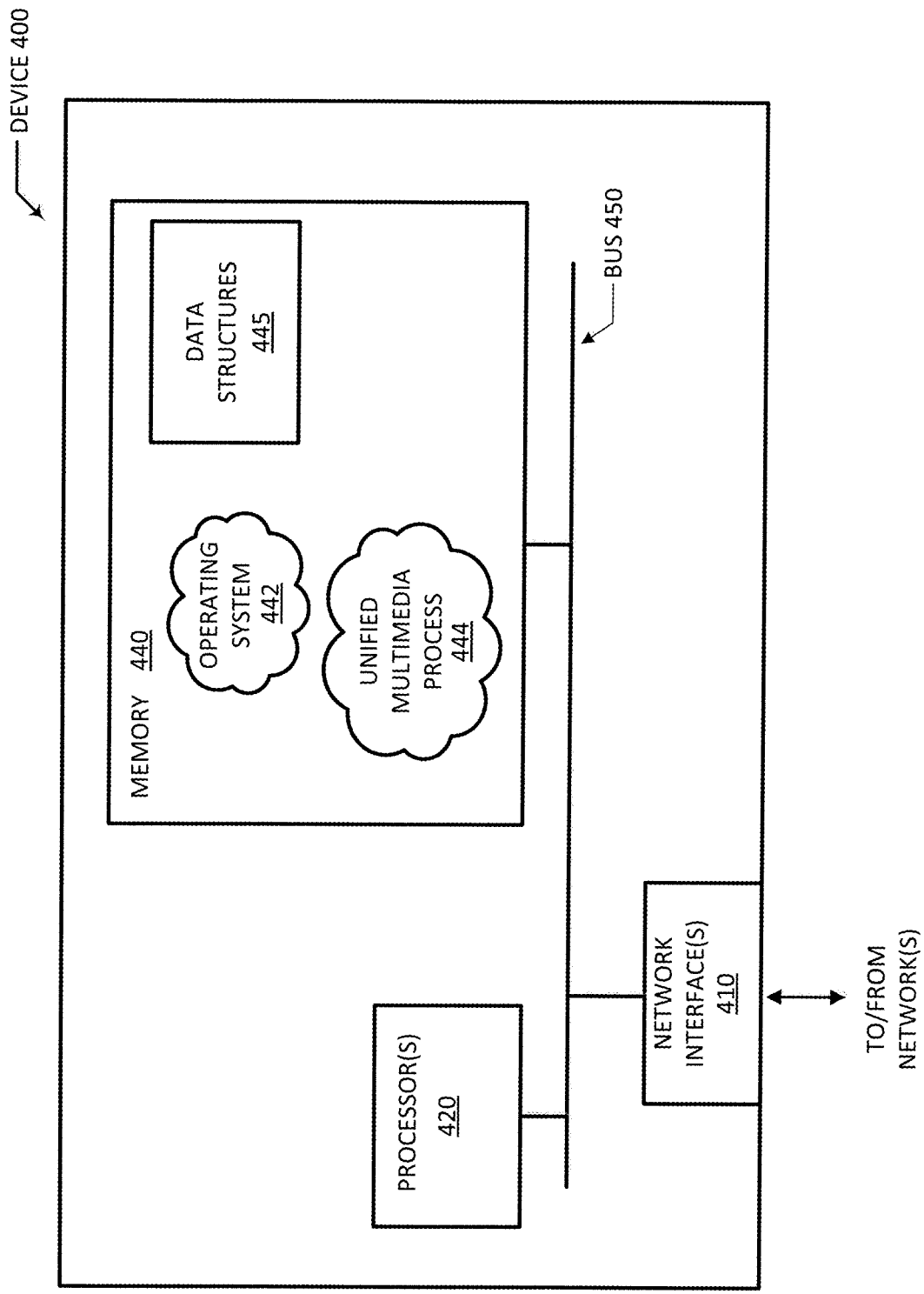
FIG. 4 illustrates an example node/device in the communication network shown in FIG. 3, in accordance with embodiments of the present invention.

FIG. 4 illustrates an example node/device 400 in the communication network shown in FIG. 3, in accordance with embodiments of the present invention. The node/device 400 may be used with one or more embodiments described herein (e.g., a device employing chunk process or chunk processing architecture 200). Device 400 is a hardware device (e.g., a computer or computer system) that includes one or more network interfaces 410, at least one processor 420 (e.g., a hardware controller/processor), and a memory 440 interconnected by a system bus 450.

Network interface(s) 410 contain the mechanical, electrical, and signaling circuitry for communicating data over physical and/or wireless links coupled to one or more CDNs, content provider networks, and the like. Network interfaces 410 may be configured to transmit and/or receive data using a variety of different communication protocols, including, inter alia, TCP/IP, UDP, wireless protocols (e.g., IEEE Std. 802.15.4, WiFi, Bluetooth®), Ethernet, Real Time Messaging Protocols (RTMP), Real Time StreamingProtocols (RTSP), Hypertext Transfer Protocols (HTTP), and HTTP Live Streaming (HLS) Protocols, etc.

Memory 440 comprises a plurality of storage locations that are addressable by the processor 420 and network interfaces 410 for storing software programs and data structures associated with the embodiments described herein. Certain embodiments of device 400 may include limited memory or no memory (e.g., no memory for storage other than for programs/processes operating on the device 400). Processor 420 includes necessary elements or logic adapted to execute the software programs and manipulate data structures 445.

An operating system 442, portions of which are typically resident in memory 440 and executed by the processor, functionally organizes the device by, inter alia, invoking operations in support of software processes and/or services executing on the device. For example, these software processes and/or services may comprise unified multimedia process/services 444. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Illustratively, the techniques described herein may be performed by hardware, software, and/or firmware, such as in accordance with the unified multimedia process 444, which may contain computer executable instructions executed by the processor 420 (or independent processor of interfaces 410) to perform functions relating to the techniques described herein.

Unified multimedia process 444, when employed by device 400, operatively processes multimedia content, including ingesting, chunking, indexing, storing, and the like. For example, as discussed in greater detail above, unified multimedia process 444 may be employed by architecture 200 to convert multimedia content into a unified multimedia format.

Figure 5:
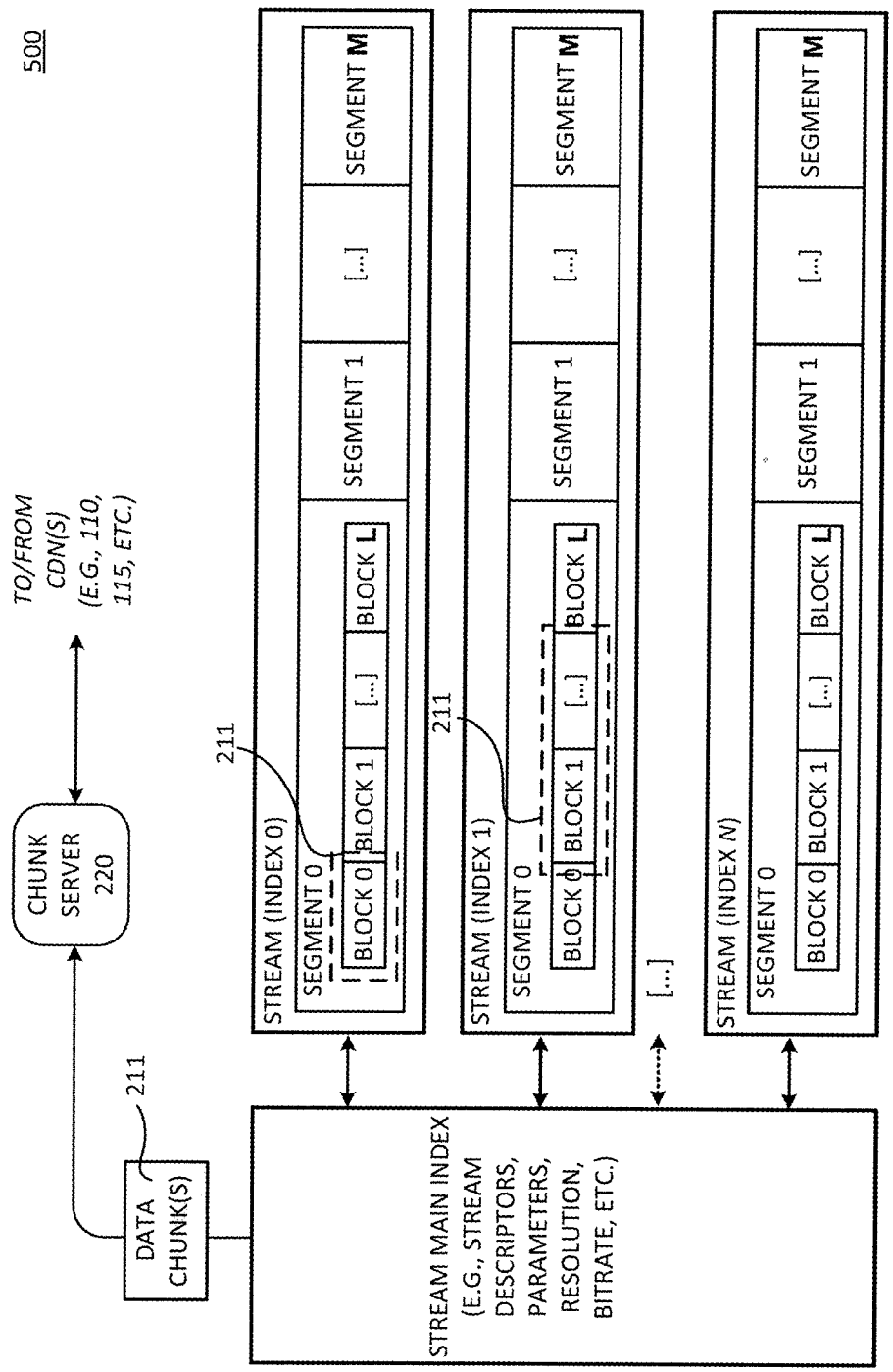
FIG. 5 illustrates unified multimedia format, in accordance with embodiments of the present invention.

FIG. 5 illustrates a unified multimedia format 500, in accordance with embodiments of the present invention. Unified multimedia format 500 includes a directory or stream main index, comprising multiple streams ("stream index" 0-N wherein N is at least 2; e.g., N=2, 3, . . . ), where each stream includes multiple stream segments ("segment" 0-M wherein M is at least 2 for each stream; e.g., M=2, 3, . . . ), and each stream segment includes multiple data blocks ("block" 0-L wherein L is at least 2 for each stream segment; e.g., L=2, 3, . . . ).

Each block of a respective segment includes actual data (e.g., raw data) such as audio, video, and other metadata about the actual data (e.g., multi-media content) to be stored. In various embodiments, each block also includes a keyframe (e.g., an intra-frame) such that each block can function as a stream entry point. As shown, a set of blocks are grouped into segments, where each segment typically refers to a file that contains the set of blocks. Notably, the segments are flexible, and any number of blocks for each segment may be used as appropriate. A sequence of segments forms a stream, as discussed above, is assigned a stream index (index 0-N). Further, each stream index typically includes segment identifiers and positions for each individual block included therein (e.g., for stream entry points). The directory or stream main index describes a set of streams and includes parameters of the respective streams (resolution, bitrate, etc.). For example, the parameters may be included in one or more table descriptors for each stream.

As discussed above, data chunk(s) 211 may be dynamically retrieved and/or generated in response to a request for content. For example, the request may be in the form of a [preset, n] format, where the preset may be "uhls/improved" and n is the number of the chunk. In response to the request, chunk server 220 queries the main index to retrieve chunks corresponding to an appropriate stream version, bitrate/resolution, length of video (so far).

In addition, as discussed above, data chunks may be generated dynamically (e.g., on demand). Operatively, chunk server 220 receives a request for content and retrieves and/or compiles a corresponding stream, segment, and/or block(s) for the request, as appropriate. The chunk size may be adjusted dynamically to include multiple blocks, as is appreciated by those skilled in the art. Thus, the present invention improves the technology of streamed multimedia data processing.

In additional embodiments, unified multimedia process 444 may further correct for missing and/or corrupted data packets (e.g., segments, blocks, chunks, etc.) in a stream. For example, when the request for content indicates a stream (or portion thereof) is unavailable (e.g., corrupted/missing, etc.), a substitute stream (or substitute portions thereof) may be retrieved. For example, unified multimedia process 444 can employ one or more time-stamping processes to appropriately index each block, segment, and/or stream according to a universal time, which enables substitution of other blocks, segments, and/or streams when appropriate. Operatively, these time stamping processes may be implemented as an extension to certain protocols (e.g., RTMP).

Figure 6:
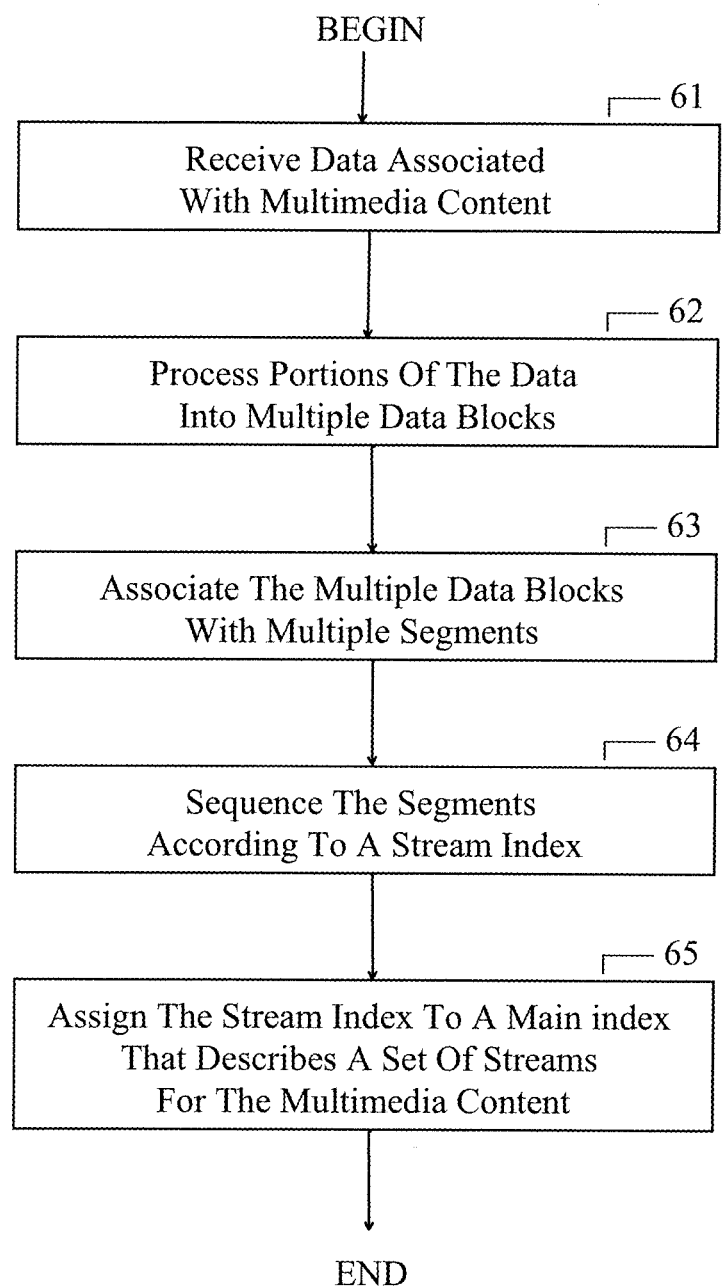
FIGS. 6-7 depict flow charts for describing a method for streaming multimedia data over a communication network, in accordance with embodiments of the present invention.
Figure 7:
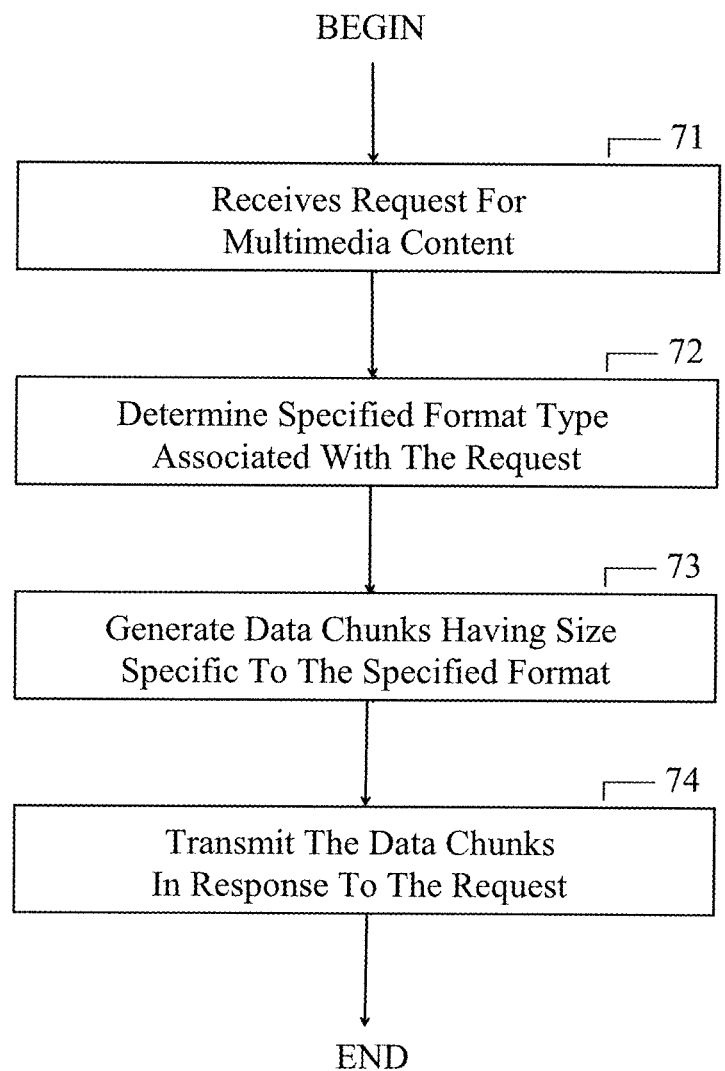

FIGS. 6-7 depict flow charts for describing a method for streaming multimedia data over a communication network, in accordance with embodiments of the present invention.

FIG. 6 includes steps 61-65.

Step 61 receives data associated with multimedia content over the communication network.

Step 62 processes portions of the data into multiple data blocks.

Step 63 associates the multiple data blocks with multiple segments by associating each segment with at least two data blocks of the multiple data blocks.

Step 64 sequences the segments of the multiple segments according to a stream index.

Step 65 assigns the stream index to a main index that describes a set of streams for the multimedia content.

FIG. 7 includes steps 71-74.

Step 71 receives a request for the multimedia content.

Step 72 determines a specified format type associated with the request.

Step 73 generates data chunks based on at least one of the data blocks or segments in response to the request for the multimedia content. Each data chunks has a size specific to the specified format.

Step 74 transmits the data chunks over the communication network in response to the request for the multimedia content.

The techniques of the present invention, therefore, provide for processing multimedia content, particularly for both live streaming broadcasts as well as buffered or recorded video content, for content and/or data transfer networks, including CDNs. These techniques provide for simplified, but efficient multimedia processing to convert incoming multimedia content into a unified multimedia format to provide a simple and clear structure and enable simple live migration of the stream to alternative storages. Such techniques can be employed by, for example, application servers associated with content and/or data transfer networks.

While there have been shown and described illustrative embodiments for processing multimedia content, it is to be understood that various other adaptations and modifications may be made within the spirit and scope of the embodiments herein. For example, the embodiments have been shown and described herein with relation to particular CDNs, ISP networks, etc. However, the embodiments in their broader sense are not as limited, and may, in fact, be used with any number of networks, client devices, and the like.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories (e.g., disks/CDs/RAM/EEPROM/etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, Firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention includes a computer readable hardware storage device or medium (e.g., a memory), having computer readable program instructions stored therein, said program instructions executable by one or more processors of a device, a computer, or a computer system to implement the methods of the present invention.

A device, a computer, or a computer system of the present invention includes one or more processors and a computer readable hardware storage device or medium (e.g., a memory), said memory containing program instructions executable by the one or more processors to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for streaming multimedia data, said method comprising:

after portions of one stream of data associated with multimedia content have been processed into multiple data blocks, associating, by one or more processors of a device, the multiple data blocks with multiple segments by associating each segment of the multiple segments with at least two data blocks of the multiple data blocks;

sequencing, by the one or more processors, the segments of the multiple segments according to a unique stream index for the one stream associated with multimedia content;

assigning, by the one or more processors, the unique stream index for the one stream to a main index that describes multiple streams for the multimedia content, wherein the multiple streams include the one stream;

receiving, by the one or more processors, a request for content of the multimedia content, said request specifying a data chunk, of multiple data chunks, that denotes the requested content, wherein the main index includes an association between each data chunk of the multiple data chunks and a set of data blocks of the data blocks in the multiple stream such that the association encompasses all of the data blocks in the multiple streams;

analyzing, by the one or more processors, the main index with respect to the specified data chunk to determine the stream and either segments or data blocks therein that encompass the requested content; and transmitting, by the one or more processors, the determined stream and either segments or data blocks therein over the communication network in response to the request.

2. The method of claim 1, wherein the main index includes a unique stream index for each stream of the multiple streams.

3. The method of claim 1, wherein the main index includes a description of how the segments in each stream are sequenced and how the data blocks in each segment are sequenced.

4. A device, comprising one or more processors and a computer readable hardware storage device, said storage device containing program instructions executable by the one or more processors to implement a method for streaming multimedia data, said method comprising:

after portions of one stream of data associated with multimedia content have been processed into multiple data blocks, associating, by the one or more processors, the multiple data blocks with multiple segments by associating each segment of the multiple segments with at least two data blocks of the multiple data blocks;

sequencing, by the one or more processors, the segments of the multiple segments according to a unique stream index for the one stream associated with multimedia content;

assigning, by the one or more processors, the unique stream index for the one stream to a main index that describes multiple streams for the multimedia content, wherein the multiple streams include the one stream;

receiving, by the one or more processors, a request for content of the multimedia content, said request specifying a data chunk, of multiple data chunks, that denotes the requested content, wherein the main index includes an association between each data chunk of the multiple data chunks and a set of data blocks of the data blocks in the multiple stream such that the association encompasses all of the data blocks in the multiple streams;

analyzing, by the one or more processors, the main index with respect to the specified data chunk to determine the stream and either segments or data blocks therein that encompass the requested content; and transmitting, by the one or more processors, the determined stream and either segments or data blocks therein over the communication network in response to the request.

5. The device of claim 4, wherein the main index includes a unique stream index for each stream of the multiple streams.

6. The device of claim 4, wherein the main index includes a description of how the segments in each stream are sequenced and how the data blocks in each segment are sequenced.

7. A computer program product, comprising a computer readable hardware storage device having computer readable program instructions stored therein, said program instructions executable by one or more processors of a device to implement a method for streaming multimedia data, said method comprising:

after portions of one stream of data associated with multimedia content have been processed into multiple data blocks, associating, by the one or more processors, the multiple data blocks with multiple segments by associating each segment of the multiple segments with at least two data blocks of the multiple data blocks;

sequencing, by the one or more processors, the segments of the multiple segments according to a unique stream index for the one stream associated with multimedia content;

assigning, by the one or more processors, the unique stream index for the one stream to a main index that describes multiple streams for the multimedia content, wherein the multiple streams include the one stream;

receiving, by the one or more processors, a request for content of the multimedia content, said request specifying a data chunk, of multiple data chunks, that denotes the requested content; wherein the main index includes an association between each data chunk of the multiple data chunks and a set of data blocks of the data blocks in the multiple stream such that the association encompasses all of the data blocks in the multiple streams;

analyzing, by the one or more processors, the main index with respect to the specified data chunk to determine the stream and either segments or data blocks therein that encompass the requested content; and transmitting, by the one or more processors, the determined stream and either segments or data blocks therein over the communication network in response to the request.

8. The computer program product of claim 7, wherein the main index includes a unique stream index for each stream of the multiple streams.

9. The computer program product of claim 7, wherein the main index includes a description of how the segments in each stream are sequenced and how the data blocks in each segment are sequenced.

* * * * *